(12) United States Patent
Kishimoto (10) Patent No.: US 8,613,076 B2
(45) Date of Patent: Dec. 17, 2013

(54) INFORMATION PROCESSING APPARATUS, INFORMATION PROCESSING METHOD, AND STORAGE MEDIUM

(75) Inventor: Hiroaki Kishimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/418,250

(22) Filed: Mar. 12, 2012

(65) Prior Publication Data

US 2012/0240219 A1 Sep. 20, 2012

(30) Foreign Application Priority Data

Mar. 14, 2011 (JP) ................................. 2011-055299

(51) Int. Cl.
G06F 21/00 (2013.01)
(52) U.S. Cl.
USPC ............................................ 726/17; 713/166
(58) Field of Classification Search
None
See application file for complete search history.

(56) References Cited

U.S. PATENT DOCUMENTS

| 2007/0073799 | A1* | 3/2007 | Adjali et al. ................... 709/200 |
| 2007/0118877 | A1* | 5/2007 | Karabulut .......................... 726/3 |
| 2007/0283425 | A1* | 12/2007 | Ture et al. ......................... 726/5 |
| 2008/0167970 | A1* | 7/2008 | Nissim ............................. 705/26 |

FOREIGN PATENT DOCUMENTS

JP        2000-148469 A    5/2000

* cited by examiner

Primary Examiner — Gilberto Barron, Jr.
Assistant Examiner — Malcolm Cribbs
(74) Attorney, Agent, or Firm — Canon U.S.A., Inc., IP Division (57) ABSTRACT

When receiving an access request to a resource of a first application from a second application, a resource management unit transfers an authentication result for the first application included in the access request to the first application, and when receiving a determination result on whether access of the second application to the resource is permitted from the first application, the resource management unit returns the determination result to the second application.

7 Claims, 6 Drawing Sheets

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus, an information processing method, and a storage medium.

2. Description of the Related Art

Conventionally, each application manages a resource of the application. For example, a first application can receive an access request to a resource managed by the first application from a second application. In such a case, conventionally, the first application itself determines whether the second application is an application which is permitted to access the resource.

A service "A" intends to control access to a resource possessed by a service "B" in a security domain "X" in Japanese Patent Application Laid-Open No. 2000-148469. In a technique discussed in Japanese Patent Application Laid-Open No. 2000-148469, the service "B" itself, which is a management source of the resource, determines availability from the service "A".

SUMMARY OF THE INVENTION

According to an aspect of the present invention, an information processing apparatus including an application execution environment in which a first application belongs to a first security domain and a second application belongs to the first security domain and a second security domain, includes a resource management unit that does not belong to either the first security domain or the second security domain and is configured to manage resources of a plurality of applications including the first application, wherein if the resource management unit receives an access request to a resource of the first application from the second application, the resource management unit transfers an authentication result for the first application included in the access request to the first application, and if the resource management unit receives a determination result on whether access of the second application to the resource is permitted from the first application, the resource management unit returns the determination result to the second application.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
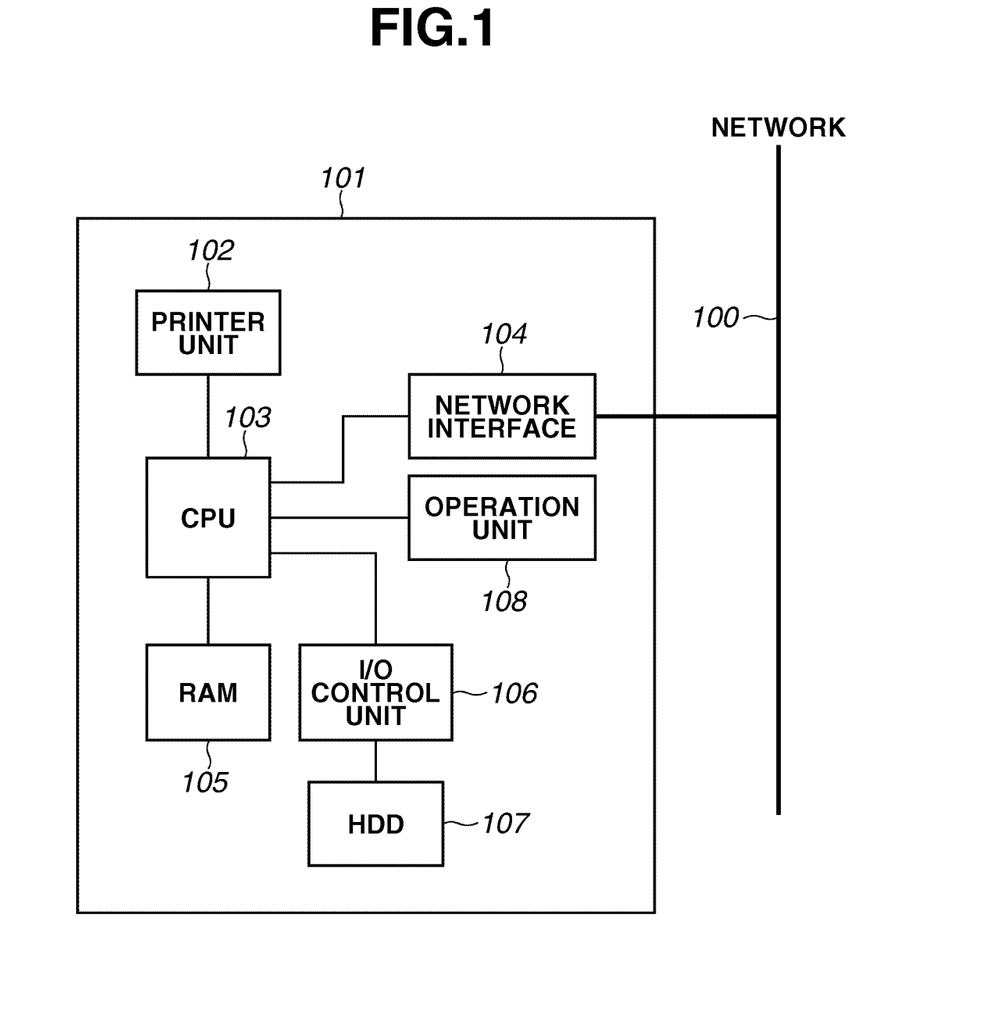
FIG. 1 illustrates an example of a hardware configuration of a digital multifunction peripheral according to an exemplary embodiment.

FIG. 1 illustrates an example of a hardware configuration of a digital multifunction peripheral according to an exemplary embodiment. The digital multifunction peripheral is an example of an information processing apparatus. In FIG. 1, a random access memory (RAM) 105, a network interface 104, a printer unit 102, an operation unit 108, and an input/output (I/O) control unit 106 are connected to a central processing unit (CPU) 103. A hard disk (HDD) 107 is connected to the CPU 103 via the I/O control unit 106.

A program is stored in the HDD 107. The CPU 103 reads and executes the program from the HDD 107. The CPU 103 executes the program, and thereby processing of a software module and a flow chart is realized, which will be described below. The software module can receive a user's operation input from the operation unit 108, and can utilize and control the printer unit 102, the RAM 105, the network interface 104, and the HDD 107.

Figure 2:
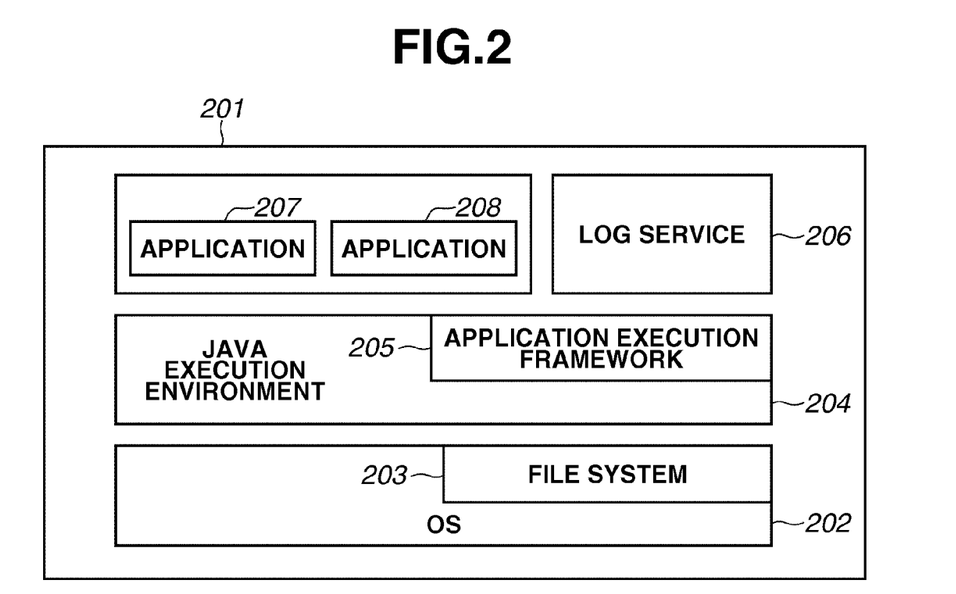
FIG. 2 illustrates an example of an execution environment of software according to an exemplary embodiment.

FIG. 2 illustrates an example of an execution environment of software according to an exemplary embodiment. An operating system (OS) 202 is a base in the software execution environment. All the software modules described below are operated on the OS 202.

All the software modules described below utilize and control a hardware module illustrated in FIG. 1 via an application programming interface (API) provided by the OS 202 directly or indirectly via a Java™ execution environment 204. Because a substance of the API is provided with the substance included in the OS 202, the API is not particularly illustrated in FIG. 2.

The Java™ execution environment 204 provides the API equalized by software operated on the OS 202 without depending on the OS 202, and a type or hardware configuration of the API provided by the OS 202. Accordingly, a virtual execution environment (virtual machine) is provided, which can enhance the development efficiency and reutilization possibility of the software module.

An application execution framework 205 provides a structure which integrally controls the entire software execution environment 201, such as management of installation and uninstallation of an application, control of an execution sequence of the application, and a communication function via the API between the applications and the software modules on the framework. The application execution framework 205 is a collective term of a software module group which provides the above-described function.

The Java™ execution environment 204 and/or the application execution framework 205 are an example of an application execution environment.

A log service 206 is a software module existing in the software execution environment 201. The log service 206 provides a function of recording and managing a log of an application, as described below with respect to FIG. 4. The log is a collective term of various behaviors of the application and histories of processing recorded as a file on a recording medium such as a hard disk or a flash memory. In the present exemplary embodiment, the log is recorded as a file on the HDD 107. The log service 206 is an example of a resource management unit.

Figure 3:
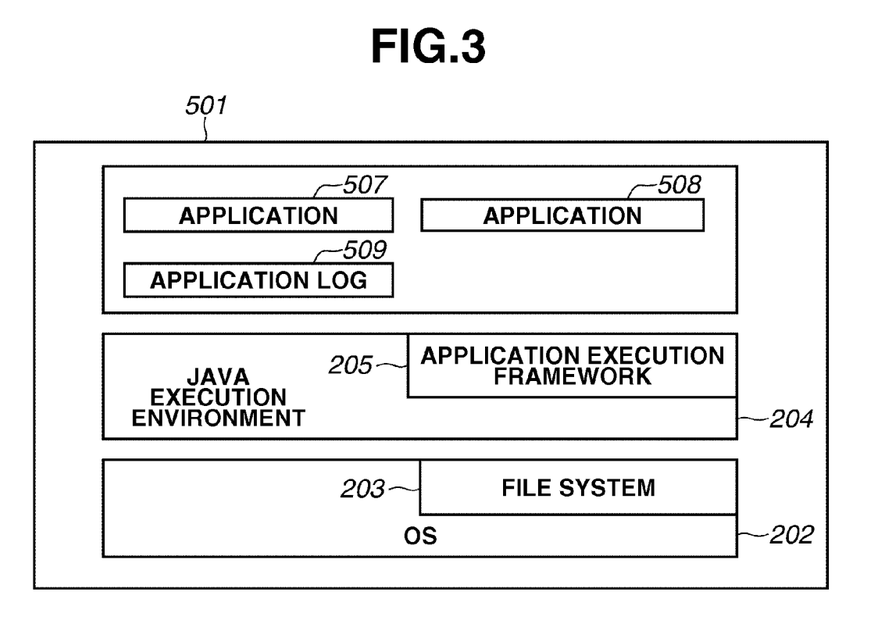
FIG. 3 illustrates an example of an execution environment of conventional software.

FIG. 3 illustrates an example of a conventional execution environment of software. In FIG. 3, in an application 507, an application log 509 is recorded on a file to which only the application 507 can access.

When an application 508 accesses the application log 509, the application 508 needs to acquire, in advance, a permission for the application 508 to access and user authority for reading out the log of the application 507. More specifically, the application 508 uses the API provided by the application 507 to acquire permission for acquiring a log from the application 507 and user authority that is under the control of the application 507. After the application 508 acquires the permission and the user authority, the application 508 can acquire the application log 509.

The application 507 not only includes an authentication function for the application 507 and an access control function of the application log 509, but also possesses the application log 509 that can be accessed from other applications. In other words, the application log 509 is located in an area managed by the application 507 itself.

Figure 4:
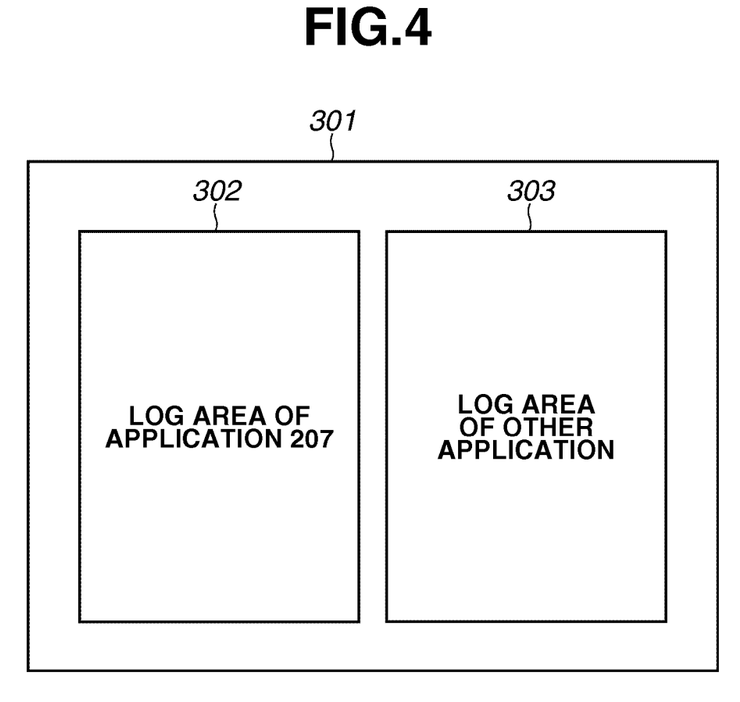
FIG. 4 illustrates a configuration of a log area according to an exemplary embodiment.

On the other hand, in FIG. 2, an arbitrary application can utilize a function of the log service 206 via the API registered to the application execution framework 205 by the log service 206. In the example in FIG. 3, the application 507 includes the application log 509. However, in the example in FIG. 2, as illustrated in FIG. 4, the log service 206 includes a plurality of application logs. In other words, the log service 206 can provide a log area to a plurality of applications such as an application 207.

The configurations as illustrated in FIGS. 2 and 4 provide for consolidation of the log areas, i.e., the log service 206. By consolidating the log areas, a form of the log, an acquisition method of the log, and the API recording and acquiring the log and the acquisition method are unified for each application. Therefore, each application can also follow the unified log form as the entire system. If the log of the log area consolidated from only the log service 206 can be extracted, the logs of all the applications existing in the system can be extracted at once in a unified manner. As a result, this causes the processing load for performing a user's log extraction and production of an application writer's log record and acquisition can be reduced.

In FIG. 2, the log service 206 provides the following functions to an arbitrary application via the API. A first function produces and secures a dedicated log area on which only the application records as a file (log file) on the HDD 107 to which only the log service 206 can directly access. A second function records the log via the API to the application. A third function reads the log via the API to the application. The details of each of these functions are described in more detail below with respect to FIG. 5.

The log service 206 can produce a plurality of log areas. However, for description purposes, the entire log area 301 managed by the log service 206 is illustrated in FIG. 4. In the entire log area 301, the application 207 produces and secures a log area 302. A log area of the other application is expressed as a log area 303 of the other application.

Figure 5:
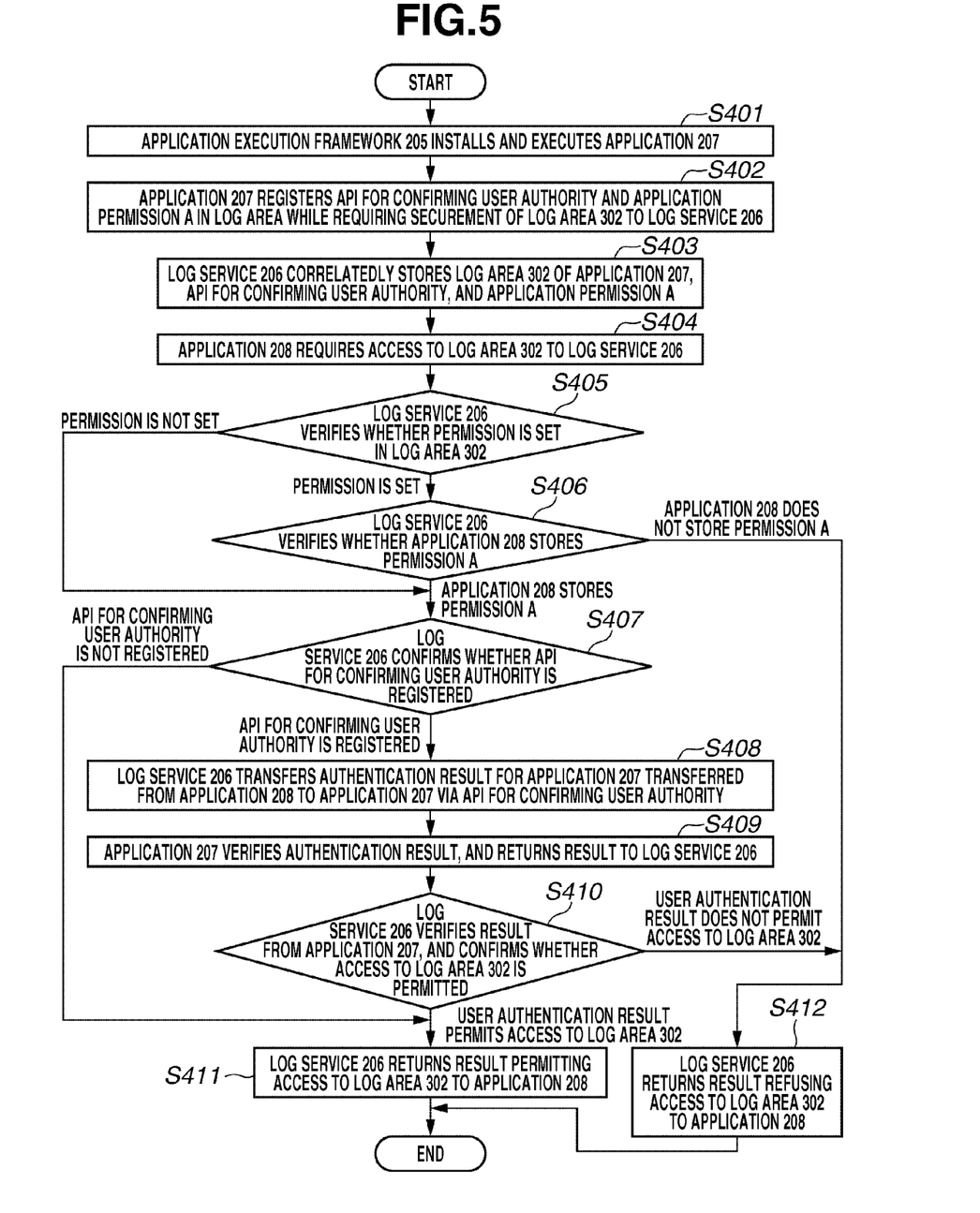
FIG. 5 is a flow chart illustrating an example of processing from installation of application until a log area of the application is secured according to an exemplary embodiment.

FIG. 5 is a flow chart illustrating an example of processing from the installation of the application to the securement of the log area 302 of the application. It is assumed that the log service 206 has been already executed by the application execution framework 205.

First, in step S401, the application 207 is installed and executed by the application execution framework 205.

The executed application 207 requests the log service 206 to secure the log area 302 dedicated for the application 207 via the above-described API. In step S402, the application 207 registers API for confirming user authority and an application permission (defined as an application permission A) in the log area 302.

The application permission is a security mechanism of a code level applied to an execution body of the application introduced in Java™. The definition and behavior of the application permission are prescribed by internal processing of the API. On the other hand, whether the permission is included or not is mounted in a form where certain definition is declared on a file in the execution body for each application.

When a function or processing is required to be executed via a certain API, the application calling up the API should include the permission. A different permission according to the function and processing of the API can be generally defined. If the application tries to utilize the API without having the permission required for utilization thereof, the permission is considered to be insufficient. The utilization of the API is thus interrupted and fails.

If the application includes the application permission A, as described below, the application permission A is considered to have a process prescribed by the application permission A, that is, authority to access to the log area 302 via the API.

The API for confirming user authority is utilized in order that the log service 206 confirms the user authority of the application 207 in the following description. The detail thereof is described below. The API for confirming user authority is not indispensably registered.

The registration of the application permission A means that an arbitrary application accessing to the log area 302 secured in step S402 is included among the permissions that the application can include. In other words, only the application including the application permission A among the arbitrary applications has authority to access to the log area 302 secured in step S402.

The registration of the application permission is determined by the provision of the application 207 serving as a holder of the log area 302. The registration must be not necessarily set. (it is not clear whether the registration must be set or does not need to be set) The user authority and the application permission are independently defined by the provision of the application 207, and are independently controlled by the log service 206. The details thereof are described below.

The application permission is described in a substance (installation package) of the arbitrary application when the application is installed. The application permission is interpreted by the application execution framework 205 during installing. While the application is executed, the Java™ execution environment 204 verifies whether the permission is included.

According to the present exemplary embodiment, when the arbitrary application utilizes the log service 206 via the API, the log service 206 can verify whether the application permission A is included via a permission check mechanism of the Java™ execution environment 204.

Next, in step S403, the log service 206 records the application permission A and the API for confirming user authority with the log area 302 as a file on the HDD 107.

Next, processing when an application 208 which is different from the application 207 as the holder of the log area 302 accesses to the log area 302 after step S404 is described. In step S404, the application 208 requests the log service 206 via the API to read the log recorded on the log area 302. The substance of this API is different from that of the above-described API. However, the API is provided to the application to access the log area 302 by the log service 206 via the same mechanism.

In response to the request, in step S405, the log service 206 verifies whether the application permission is set to the log area 302. The log service 206 can perform the verification based on information stored in the file with the log area 302 as described above.

If the log service 206 can verify that the log area 302 stores the application permission A (permission is set in step S405), then in step S406, the log service 206 verifies whether the application 208 includes the application permission A based on the information. In step S405, if the application permission is not set to the log area 302, the processing proceeds to step S407 without performing the verification in step S406. Also if the application permission A is set to the log area 302 and the application 208 includes the application permission A, the processing proceeds to step S407.

If the application 208 does not include the application permission A, then in step S412, the log service 206 does not respond to the read request of the application 208, and returns the result to the application 208.

In step S407, the log service 206 confirms whether the API for confirming user authority is registered from the application 207 to the log area 302. If the API for confirming user authority is not registered in the log area 302, then in step S411, the log service 206 permits access to the log area 302 of the application 208, and returns the result to the application 208.

On the other hand, in step S407, if the API for confirming user authority is registered, the log service 206 inquires the application 207 whether the user authority for the log area 302 is appropriate with use of the API. It is assumed that the application 208 preliminarily completes user authentication to the application 207 without the log service 206.

The user authentication is authentication in which a user who operates, for example, the application 208 to access the log area of the application 207 via the application 208 performs via the predetermined API to the application 207.

In other words, the application 207 is provided with an API uniquely performing user authentication to another application. The application 208 can perform the user authentication under the control of the application 207 according to the API, and can further obtain the authentication result from the application 207. In other words, the application 208 does not need to request the log service 206 to perform the user authentication.

The user authentication may be executed by a user name including a domain name to which the application 207 belongs, or a combination of a user name excluding the domain name and a password. The user authentication may be performed by authentication according to an integrated circuit (IC) card via an external authentication device installed to the apparatus, and biometrics such as a fingerprint and iris authentication.

The authentication result may be transferred to the API via which the application 208 requests the access from the log service 206. The authentication result may be transferred via another API. In any case, in step S408, the log service 206 transfers the authentication result to the application 207 via the API for confirming user authority. In step S409, the application 207 determines whether the access authority to the log area 302 exists in the user indicated in the authentication result, and returns the determination result to the log service 206.

In step S410, the log service 206 determines whether the authentication result of the user operating the application 208 includes authority to access to the log area 302 according to the determination result.

If the access to the log area 302 is not permitted, then in step S412, the log service 206 returns the result refusing the access to the application 208. If the access to the log area 302 is permitted, then in step S411, the log service 206 returns the result of the access permission to the application 208.

The result shown herein determines whether the access to the log area 302 is permitted by the authenticated user via the application 208, and results in the following process. More specifically, if the user authenticated to the application 207 is determined to be an administrator in the application 207, the user is considered to have administrator authority. For the user considered to be the administrator by the application 207, the access to the log area 302 stored by the application 207 is accepted. However, if the authenticated user is a general user for the application 207, the access is not accepted. The result thus returned is succeedingly required to be specified as a parameter via the log area 302 to the log service 206 via the API. In other words, only when an argument of the API includes authentication result information, the API permits the access to the log area 302 and performs processing.

As described above, the log service 206 can perform the following access control according to processing from step S401 to step S412. More specifically, the log service 206 can cause the application 207 to perform access control according to the permission of the application previously set to the log area 302 for the access request from the application 208 to the log area 302 stored under the control of the log service 206.

That is, the log service 206 can completely entrust the application 207 with determination of access to the log area 302 based on the user authority managed by the application 207. In other words, although the log service 206 manages the log area 302 of the application 207, the access control to the log area 302 can follow the access control method set by the application 207.

Figure 6:
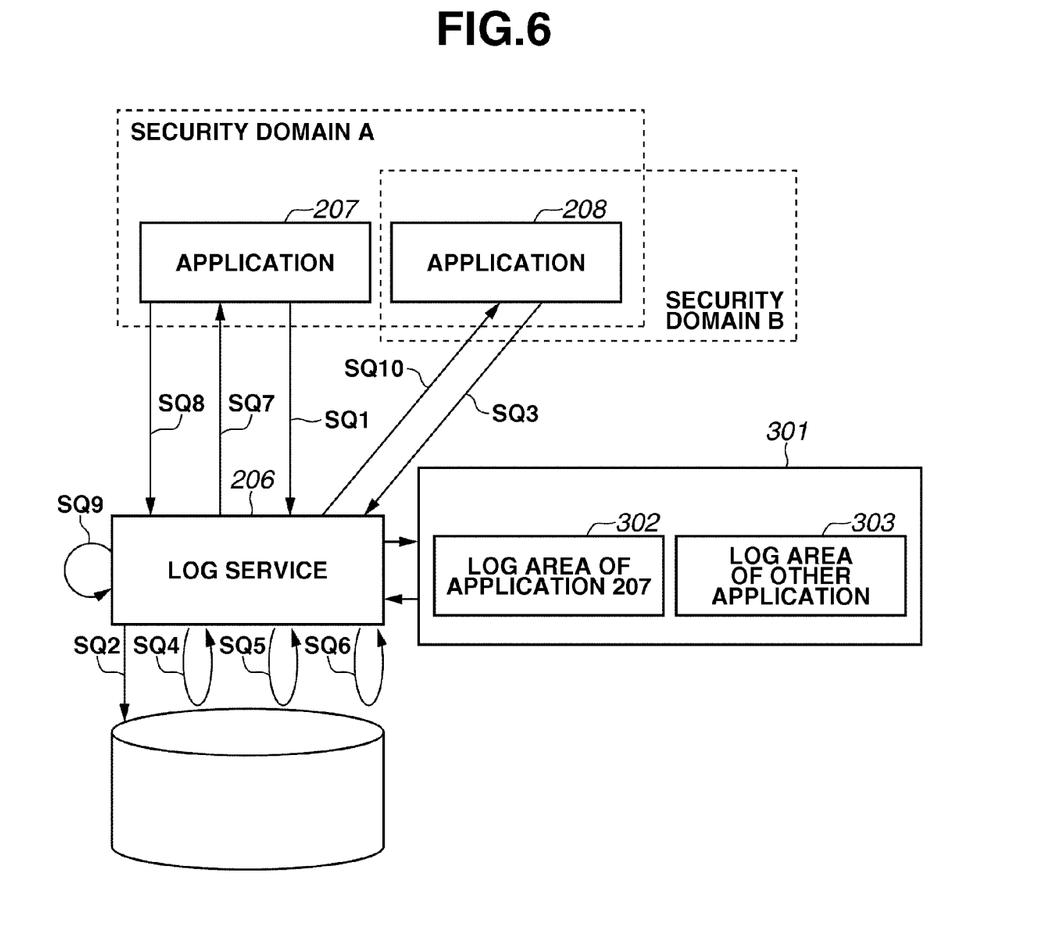
FIG. 6 illustrates processing for controlling access to a log (or a log area) with use of a software configuration according to an exemplary embodiment.

FIG. 6 illustrates processing of access control to a log (or a log area) with use of a software configuration.

In event SQ1, the log service 206 receives a securement request of the log area 302 via the API from the application 207 belonging to a security domain A, for example. The log service 206 also receives a registration request including the API for confirming the user authority of the log area and the application permission A from the application 207 belonging to the security domain A. The security domain A is an example of a first security domain. A security domain B is an example of a second security domain.

Then, in event SQ2, the log service 206 secures the log area 302 in the entire managed log area 301, and records the application permission A and the API for confirming user authority as the file on the HDD 107 in association with the log area 302.

In event SQ3, the log service 206 receives an access request to the log (or log area) recorded on the log area 302 from the application 208 belonging to the security domain A and the security domain B, for example.

In event SQ4, the log service 206 verifies whether the application permission is set to the log area 302 based on the information recorded on the file.

When the application permission is set, in event SQ5, the log service 206 verifies whether the application 208 transmitting the access request includes the application permission A set to the log area 302. The log service 206 performs the verification via the permission check mechanism of the Java execution environment 204 as described above.

When the application 208 includes the application permission A, in event SQ6, the log service 206 confirms whether the API for confirming user authority is registered in the file in association with the log area 302.

When the API for confirming user authority is registered in the file in association with the log area 302, in event SQ7, the log service 206 transfers the above-described authentication result to the application 207 via the API for confirming user authority.

In event SQ8, the log service 206 receives the determination result on whether the access authority to the log area 302 exists in the user indicated in the authentication result from the application 207.

In event SQ9, the log service 206 verifies the determination result received from the application 207, and confirms whether the access to the log area 302 is permitted. For example, when the determination result received from the application 207 indicates the existence of the access authority to the log area 302 in the user indicated in the authentication result, the log service 206 permits the access to the log area 302. On the other hand, when the determination result received from the application 207 indicates the nonexistence of the access authority to the log area 302 in the user indicated in the authentication result, the log service 206 does not accept the access to the log area 302.

In event SQ10, the log service 206 returns the result indicating whether the access to the log area 302 is permitted, to the application 208. Although the log service 206 returns the result indicating whether the access is permitted in the present exemplary embodiment, the log service 206 may transmit the log of the log area 302 to the application 208 at the timing of the response in event SQ10 according to the confirmation of the acceptance of the access.

As described above, because the log service 206 does not belong to the security domain to which the application 207 and the application 208 belong, the log service 206 cannot determine whether to permit the application 208 to access the log area 302 of the application 207. However, processing illustrated in FIG. 6 enables the log service 206 to control the access to the log area 302 of the application 207 from the application 208.

The above-described exemplary embodiments enable the access control from the second application to the resource of the first application by the service which manages the resources of the plurality of applications in an integrated fashion. In the above-described exemplary embodiments, the log or the log area is described as an example of the resource. However, the description does not limit the exemplary embodiment.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-055299 filed Mar. 14, 2011, which is hereby incorporated by reference herein in its entirety.

What is claimed is:

1. An information processing apparatus including an application execution environment in which a first application belongs to a first security domain and a second application belongs to the first security domain and a second security domain, the information processing apparatus comprising:
   a memory;
   a processor in communication with the memory, the processor configured to control a resource management unit that does not belong to either the first security domain or the second security domain and that is configured to manage resources of a plurality of applications including the first application,
   wherein if the resource management unit receives an access request to a resource of the first application from the second application, the resource management unit transfers an authentication result for the first application included in the access request to the first application, and if the resource management unit receives a determination result on whether access of the second application to the resource is permitted from the first application, the resource management unit returns the determination result to the second application,
   wherein if the resource management unit receives the access request to the resource of the first application from the second application, the resource management unit determines whether an interface for an inquiry to the first application is associated with the resource, and if the interface for the inquiry to the first application is associated with the resource, the resource management unit transfers the authentication result for the first application included in the access request to the first application via the interface, and
   wherein the resource management unit is embodied by one or more central processing units of the information processing apparatus.

2. The information processing apparatus according to claim 1, wherein the second application belonging to the first security domain can authenticate the first application belonging to the first security domain, and the authentication result included in the access request is obtained by authentication preliminary performed by the second application, and
   wherein the resource management unit cannot determine whether access to the resource is permitted.

3. The information processing apparatus according to claim 1, wherein if the resource management unit receives the determination result indicating permission of the access to the resource by the second application from the first application, the resource management unit returns a determination result indicating the permission of the access to the resource to the second application, and if the resource management unit receives a determination result indicating non-permission of the access to the resource by the second application from the first application, the resource management unit returns a determination result indicating the non-permission of the access to the resource to the second application.

4. The information processing apparatus according to claim 1, wherein the resource is a log of an application, and
   wherein the resource management unit manages logs of a plurality of applications including the first application.

5. The information processing apparatus according to claim 1, wherein the resource management unit registers the resource of the first application and the interface for the inquiry to the first application in association with each other.

6. A method for information processing in an information processing apparatus including an application execution environment in which a first application belongs to a first security domain and a second application belongs to the first security domain and a second security domain, the method comprising:

receiving an access request to a resource of the first application from the second application;

determining that an interface for an inquiry to the first application is associated with the resource;

transferring an authentication result for the first application included in the access request to the first application via the interface;

receiving a determination result on whether access of the second application to the resource of the first application is permitted; and returning the determination result to the second application.

7. A non-transitory computer-readable medium storing a program for causing a computer including an application execution environment in which a first application belongs to a first security domain and a second application belongs to the first security domain and a second security domain, to implement a method for information processing, the method comprising: receiving an access request to a resource of the first application from the second application; determining that an interface for an inquiry to the first application is associated with the resource; transferring an authentication result for the first application included in the access request to the first application via the interface; receiving a determination result on whether access of the second application to the resource of the first application is permitted; and returning the determination result to the second application.

* * * * *